US010753454B2

(12) United States Patent
Morita (10) Patent No.: US 10,753,454 B2
(45) Date of Patent: Aug. 25, 2020

(54) VEHICULAR BREATHER DEVICE

(71) Applicant: TOYOTA JIDOSHA KABUSHIKI KAISHA, Toyota-shi, Aichi (JP)

(72) Inventor: Hiroki Morita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 16/131,862

(22) Filed: Sep. 14, 2018

(65) Prior Publication Data

US 2019/0085967 A1 Mar. 21, 2019

(30) Foreign Application Priority Data

Sep. 20, 2017 (JP) ................................. 2017-180722

(51) Int. Cl.
| | |
|---|---|
| *F16H 57/027* | (2012.01) |
| *F16H 57/035* | (2012.01) |
| *F02D 41/08* | (2006.01) |
| *F16H 7/02* | (2006.01) |
| *F02D 31/00* | (2006.01) |

(52) U.S. Cl.
CPC ......... *F16H 57/027* (2013.01); *F02D 31/008* (2013.01); *F02D 41/08* (2013.01); *F02D 41/086* (2013.01); *F16H 7/02* (2013.01); *F16H 57/035* (2013.01); *F02D 2200/023* (2013.01); *F02D 2200/501* (2013.01)

(58) Field of Classification Search
CPC .................................................. F16H 57/027
See application file for complete search history.

(56) References Cited

U.S. PATENT DOCUMENTS

| | | | | |
|---|---|---|---|---|
| 4,987,795 A | * | 1/1991 | Nguyen | F16H 57/027 464/170 |
| 6,651,635 B2 | * | 11/2003 | Kunimitsu | F01M 13/04 123/572 |
| 8,821,332 B2 | * | 9/2014 | Kawamura | F16H 57/0424 475/160 |
| 9,309,959 B2 | * | 4/2016 | Ishikawa | F16H 57/027 |
| 10,473,206 B2 | * | 11/2019 | Neumann | F16H 57/027 |
| 2002/0139333 A1 | | 10/2002 | Kusano et al. | |

(Continued)

FOREIGN PATENT DOCUMENTS

| | | | | |
|---|---|---|---|---|
| GB | 1181125 A | * | 2/1970 | ........... F16H 57/027 |
| JP | 08178027 A | * | 7/1996 | ......... F16H 57/0483 |

(Continued)

*Primary Examiner* — Sherry L Estremsky
(74) *Attorney, Agent, or Firm* — Oliff PLC (57) ABSTRACT

A vehicular breather device through which an inside space of a casing accommodating a power transmitting system of a vehicle is open to an outside atmosphere outside the casing, the vehicular breather device including: a second shaft rotated with a rotary motion of a first shaft of the power transmitting system transmitted thereto through a power transmitting member, the second shaft being accommodated within the casing, having a breather chamber formed therethrough, and being disposed so as not to contribute to transmission of a vehicle drive force through the power transmitting system; and a breather disposed so as to extend through a communication hole formed through the casing, for communication between the breather chamber and the outside atmosphere outside the casing.

16 Claims, 6 Drawing Sheets

(56) References Cited

U.S. PATENT DOCUMENTS

2019/0107191 A1\* 4/2019 Ogawa ................ F16H 57/0409
2020/0055610 A1\* 2/2020 Terwilliger ............. B60L 53/24

FOREIGN PATENT DOCUMENTS

| JP | 2002-295275 A | 10/2002 |
|---|---|---|
| JP | 2003-161362 A | 6/2003 |
| JP | 2006-275192 A | 10/2006 |
| JP | 2013-057371 A | 3/2013 |

\* cited by examiner

|  | C1 | C2 | C3 | C4 | B1 | B2 |
|---|---|---|---|---|---|---|
| 1st | O | O |  |  |  | O |
| 2nd | O |  |  |  | O | O |
| 3rd |  | O |  |  | O | O |
| 4th |  |  |  | O | O | O |
| 5th |  | O |  | O | O |  |
| 6th | O |  |  | O | O |  |
| 7th | O |  | O | O |  |  |
| 8th |  |  | O | O | O |  |
| 9th | O |  | O |  | O |  |
| 10th |  | O | O |  | O |  |
| Rev |  | O | O |  |  | O |

O: ENGAGED

VEHICULAR BREATHER DEVICE

This application claims priority from Japanese Patent Application No. 2017-180722 filed on Sep. 20, 2017, the disclosure of which is herein incorporated by reference in its entirety.

FIELD OF THE INVENTION

The present invention relates generally to a vehicular breather device, and more particularly to an arrangement of a breather chamber provided in a transaxle casing of a vehicle.

BACKGROUND OF THE INVENTION

The transaxle casing accommodates not only a power transmitting system including a torque converter and a transmission, but also a lubricating device for delivering a working fluid or a lubricant to various components of the power transmitting system. There is known a breather device through which an inside space within the transaxle casing is open to the outside atmosphere, for eliminating a difference between the inside air pressure and the outside atmospheric pressure, which difference is caused by a variation of an air volume within the transaxle casing due to a change of a temperature of the lubricant. JP-2013-057371A discloses an example of such a vehicular breather device. The vehicular breather device disclosed in this publication JP-2013-057371A has a breather chamber formed through a counter shaft disposed in a power transmitting path from an engine to drive wheels of the vehicle. The particles of the lubricant are separated from the air with a centrifugal force generated during rotation of the counter shaft, and the thus separated lubricant particles are ejected radially outwardly of the breather chamber, so that the lubricant is prevented from mixing with the air flowing through communication hole (air vent) for communication of the breather chamber with the outside atmosphere, in spite of a rise of level of the lubricant within the transaxle casing.

SUMMARY OF THE INVENTION

In the vehicular breather device described above, the breather chamber is formed through the counter shaft. This counter shaft is required to be held in meshing engagement with a main shaft driven by the engine, through gears having a gear ratio suitable for transmitting a drive force of the engine from the main shaft to the counter shaft. Accordingly, there are limitations regarding the position of the counter shaft with respect to the main shaft, namely, positions of the breather chamber in the radial and circumferential directions of the main shaft, that is, limitations regarding a distance of the breather chamber from the axis of rotation of the main shaft, and an angular position of the breather chamber in the direction of rotation of the main shaft.

The present invention was made in view of the background art described above. It is therefore an object of the present invention to provide a vehicular breather device which has an improved degree of freedom of positioning of its breather chamber.

The object indicated above is achieved according to the following modes of the present invention:

According to a first mode of the invention, there is provided a vehicular breather device through which an inside space of a casing accommodating a power transmitting system of a vehicle is open to an outside atmosphere outside the casing, the vehicular breather device comprising: a second shaft rotated with a rotary motion of a first shaft of the power transmitting system transmitted thereto through a transmission belt, the second shaft being accommodated within the casing, having a breather chamber formed therethrough, and being disposed so as not to contribute to transmission of a vehicle drive force through the power transmitting system; and a breather disposed so as to extend through a communication hole formed through the casing, for communication between the breather chamber and the outside atmosphere outside the casing.

According to a second mode of the invention, the first shaft is rotated by a drive power source.

According to a third mode of the invention, the first shaft is a cylindrical member which extends from a pump shell of a torque converter rotated by the drive power source, in an axial direction of the torque converter away from the drive power source.

According to a fourth mode of the invention, the power transmitting system includes: a transmission having an input shaft which is rotated by the torque converter and which partially extends through a bore formed through the cylindrical member; and a first power transmitting portion for transmitting the rotary motion of the first shaft to the power transmitting member, the first power transmitting portion being disposed between the torque converter and the transmission in an axial direction of the first shaft.

According to a fifth mode of the invention, the second shaft is a drive shaft of an oil pump disposed within the casing.

According to a sixth mode of the invention, the second shaft is a drive shaft of an oil pump disposed within the casing, and the power transmitting system includes a second power transmitting portion for transmitting the rotary motion of the first shaft to the drive shaft of the oil pump through the power transmitting member, the second power transmitting portion being disposed between the torque converter and a body portion of the oil pump in an axial direction of the drive shaft.

According to a seventh mode of the invention, the vehicle is provided with an electronic control device configured to control an operation of the drive power source, and the electronic control device implements an idling speed control to raise an idling speed of the drive power source, for raising a rotating speed of the second shaft rotated by the first shaft and having the breather chamber, when a temperature of a lubricant within the casing when the vehicle is in a stopped state is equal to or higher than a predetermined threshold value, and/or when the vehicle has been stopped within a predetermined length of threshold time after a running speed of the vehicle has been kept equal to or higher than a predetermined threshold value for more than a predetermined length of running time.

According to an eighth mode of the invention, the power transmitting member is a belt or a chain.

According to the first mode of the invention, the vehicular breather device is configured to include the second shaft and the breather. The second shaft is rotated with the rotary motion of the first shaft of the power transmitting system transmitted thereto through the power transmitting member, and is accommodated within the casing. The second shaft has the breather chamber formed therethrough, and is disposed so as not to contribute to transmission of the vehicle drive force through the power transmitting system. The breather is disposed so as to extend through the communication hole formed through the casing, for communication between the breather chamber and the outside atmosphere outside the casing. Thus, the second shaft having the breather chamber formed therethrough is connected to the first shaft through the power transmitting member. Accordingly, the present vehicular breather device has an improved degree of freedom of positioning of the breather chamber formed through the second shaft, in both of the radial and circumferential (rotational) directions of the first shaft, namely, an improved degree of freedom of determination of a distance of the breather chamber from the axis of rotation of the first shaft, and an angular position of the breather chamber in the direction of rotation of the first shaft.

In the vehicular breather device according to the second mode of the invention wherein the first shaft is rotated by the drive power source, a rotating speed of the second shaft is controllable by controlling an operating speed of the drive power source operated to drive the first shaft, so that a capacity of the breather chamber to separate particles of the lubricant from the air flowing therethrough together with the lubricant particles is controllable.

According to the third mode of the invention, the first shaft is the cylindrical member which extends from the pump shell of the torque converter rotated by the drive power source, in the axial direction of the torque converter away from the drive power source. Namely, a drive force of the drive power source is transmitted to the first shaft through an existing power transmitting mechanism in the power transmitting system, in the form of the torque converter (its pump shell). Accordingly, the present power transmitting mechanism between the drive power source and the first shaft requires a reduced installation space, than any other power transmitting mechanism not normally existing in the power transmitting system.

According to the fourth mode of the invention, the power transmitting system includes the transmission having the input shaft rotated by the torque converter and partially extending through the bore formed through the cylindrical member. The power transmitting system further has the first power transmitting portion for transmitting the rotary motion of the first shaft to the power transmitting member, and the first power transmitting portion is disposed between the torque converter and the transmission in the axial direction of the first shaft. Accordingly, the first power transmitting portion disposed between the torque converter and the transmission may be a member having a relatively small length in the axial direction of the first shaft, so that the torque converter and the transmission may be disposed so as to effectively utilize the inner space within the casing.

In the vehicular breather device according to the fifth mode of the invention, the second shaft is the drive shaft of the oil pump disposed within the casing. Since the second shaft having the breather chamber formed therethrough is the drive shaft of the oil pump, a space used for installation of the oil pump is effectively utilized to provide the breather chamber of the vehicular breather device. Further, the oil pump need not be disposed near the first shaft in the radial direction of the first shaft, so that a portion of the power transmitting system, which portion includes the torque converter and the transmission, may be constructed with a reduced dimension in the axial direction of the first shaft.

In the vehicular breather device according to the sixth mode of the invention, the second shaft is the drive shaft of the oil pump disposed within the casing, and the power transmitting system includes the second power transmitting portion for transmitting the rotary motion of the first shaft to the drive shaft of the oil pump through the power transmitting member. The second power transmitting portion is disposed between the torque converter and the body portion of the oil pump in the axial direction of the drive shaft. Namely, the body portion of the oil pump is located on one of opposite sides of the second power transmitting portion which is remote from the torque converter in the axial direction of the drive shaft of the oil pump. Thus, the body portion of the oil pump can be located without an interference with the torque converter, and the torque converter and the oil pump can be disposed within the casing, so as to effectively utilize the inner space within the casing.

According to the seventh mode of the invention, the vehicle is provided with the electronic control device configured to control the operation of the drive power source, and the electronic control device implements the idling speed control to raise the idling speed of the drive power source, for raising the rotating speed of the second shaft rotated by the first shaft and having the breather chamber, when the temperature of the lubricant within the casing when the vehicle is in the stopped state is equal to or higher than the predetermined threshold value, and/or when the vehicle has been stopped within the predetermined length of threshold time after the running speed of the vehicle has been kept equal to or higher than the predetermined threshold value for more than the predetermined length of running time. Accordingly, it is possible to prevent insufficiency of the capacity of the breather chamber to separate the lubricant particles from the air flowing therethrough together with the lubricant particles.

The vehicular breather device according to the eighth mode of the invention is configured such that the power transmitting member is one of the belt and chain, which is selected as needed.

DETAILED DESCRIPTION OF PREFERRED EMBODIMENT

A preferred embodiment of a vehicular breather device of the present invention will be described in detail by reference to the drawings.

Figure 1:
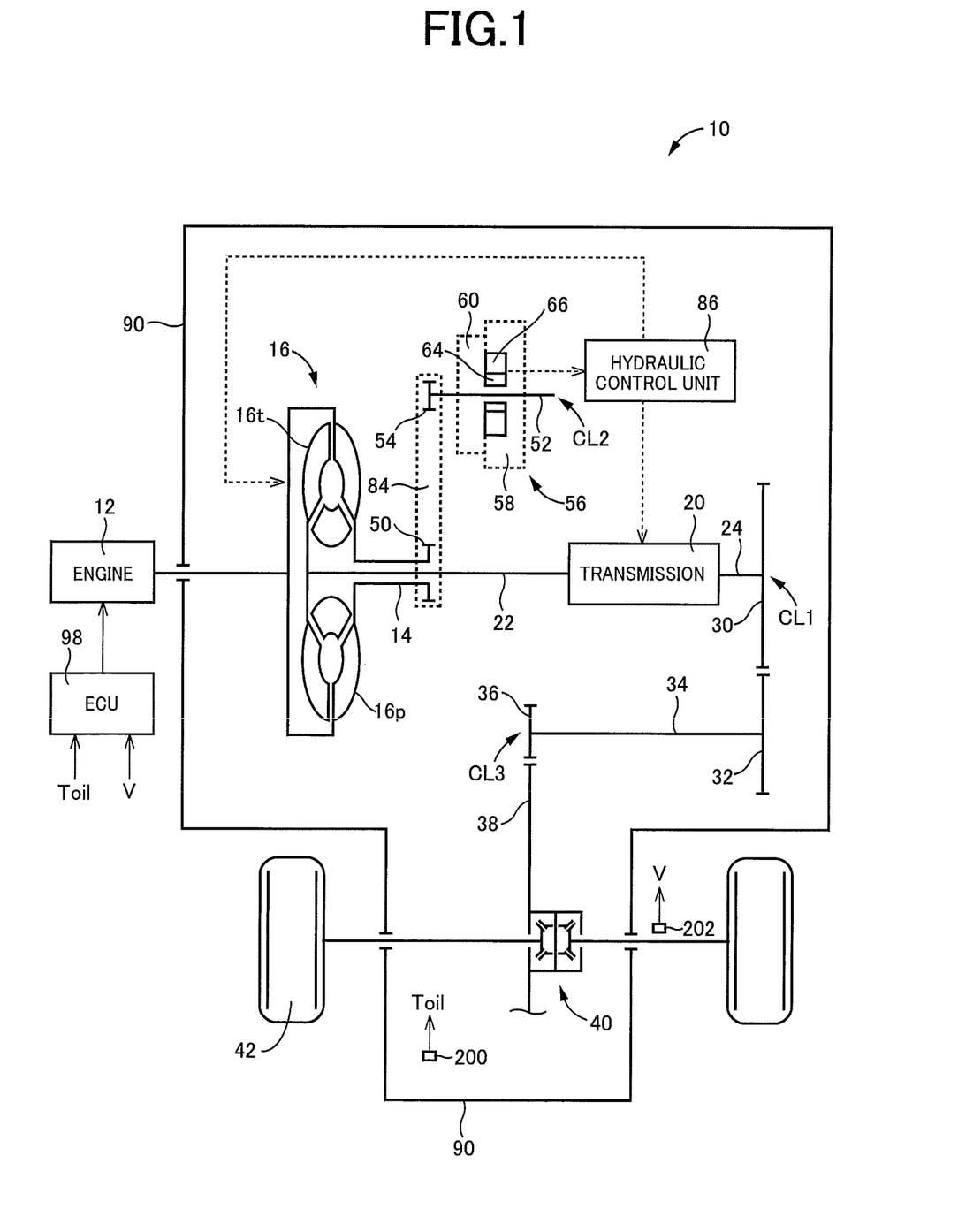
FIG. 1 is a schematic view showing an arrangement of a vehicle provided with a breather device according to one embodiment of this invention.

Reference is first made to FIG. 1, which is the schematic view showing an arrangement of a vehicle 10 provided with a vehicular breather device 100 according to one embodiment of this invention. For example, the vehicle 10 is an FF (front-engine front-drive) type vehicle having an automatic transmission provided with a torque converter 16 and a transmission 20. In FIG. 1, a drive power source in the form of an engine 12, the transmission 20 and a hydraulic control unit 86 are shown by a functional block diagram, while the torque converter 16, and a power transmitting path from the transmission 20 to drive wheels 42 of the vehicle 10 are schematically shown.

The torque converter 16 is a fluid-operated power transmitting device which is interposed between the engine 12 and an input shaft 22 of the transmission 20 and which is configured to transmit a drive force through a working fluid. The torque converter 16 includes: a pump shell 16p having a front shell member and a rear shell member which cooperate to define a pump impeller therebetween; a turbine shell 16t having a turbine impeller to which a rotary motion of the pump impeller of the pump shell 16p is transmitted through the working fluid; and a stator interposed between the pump impeller and the turbine impeller. A rotary motion of the engine 12 is transmitted to the input shaft 22 of the transmission 20 through the pump shell 16p and turbine shell 16t of the torque converter 16.

A first cylindrical member 14 extends from the pump shell 16p in an axial direction away from the engine 12. The input shaft 22 partially extends through a bore of the first cylindrical member 14, and is connected, at its one axial end remote from the transmission 20, to the turbine shell 16t, such that the first cylindrical member 14 and the input shaft 22 are coaxial with each other and are rotated about a common axis CL1. It is noted that the first cylindrical member 14 corresponds to a first shaft of a power transmitting system accommodated in a transaxle casing 90 provided with the vehicular breather device 100 according to the present invention.

The transmission 20 is a multiple-step transmission having a plurality of gear positions having respective values of its speed ratio, which is a ratio of a rotating speed of its input shaft 22 to a rotating speed of its output shaft 24 which is coaxial with the first cylindrical member 14 and the input shaft 22, namely, rotated about the common axis CL1. A rotary motion of the input shaft 22 is transmitted to drive wheels 42 of the vehicle 10 through the above-indicated power transmitting system. Namely, the rotary motion of the input shaft 22 transmitted to the transmission 20 is transmitted to a counter drive gear 30 through the output shaft 24. A rotary motion of the counter drive gear 30 is transmitted to a counter driven shaft 34 through a counter driven gear 32 which is rotatable about an axis CL3. A rotary motion of the counter driven shaft 34 is transmitted to a differential ring gear 38 of a differential gear device 40 through a differential drive pinion 36, and is transmitted to the drive wheels 42 through the differential gear device 40.

By the way, the transmission 20 is configured such that its output speed, that is, the rotating speed of the output shaft 24 is higher than rotating speeds of the drive wheels 42, in view of durability of gears of the transmission 20 and durability of a power transmitting path downstream of the output shaft 24, and is reduced by the differential ring gear 38 (final speed reduction gear) before the rotary motion of the output shaft 24 is finally transmitted to the drive wheels 42. Generally, the ratio of reduction of the rotating speed of the output shaft 24 of the transmission 20 with respect to the rotating speed of the differential ring gear 38 is selected within a range between 1/4 and 1/6. To hold the above-indicated speed reduction ratio within this range, the gear ratio between the counter drive gear 30 and the counter driven gear 32, and the gear ratio between the differential drive pinion 36 and the differential ring gear 38 are required to be determined for adequate transmission of a vehicle drive force from the output shaft 24 to the differential ring gear 38. Accordingly, the output shaft 24 and the counter shaft 34 are required to be connected to each other with mutual meshing of the counter drive and driven gears 30 and 32 having the adequately determined gear ratio. Therefore, a distance between the output shaft 24 and the counter shaft 34 in their radial directions is determined by diameters of the gears 30 and 32. Namely, the distance of the counter shaft 34 from the rotation axis CL1 of the input and output shafts 22 and 24 is limited, that is, required to be held within a predetermined range. Further, the counter shaft 34 is connected to the differential ring gear 38 of the differential gear device 40 through the differential drive pinion 36, so that the counter shaft 34 is required to be located relatively close to the differential gear device 40 in the radial direction. Therefore, the position of the counter shaft 34 is limited also in the circumferential direction of the input and output shafts 22 and 24, that is, the angular position of the counter shaft 34 in the direction of rotation of the input and output shafts 22 and 24 about the axis CL1 is also limited. In this respect, it is noted that the lubricant within the differential gear device 40 is vigorously agitated or stirred by the differential ring gear 38, so that a breather chamber if provided near the differential gear device 40 would easily and disadvantageously receive particles of the agitated lubricant.

The first cylindrical member 14 has a first power transmitting portion in the form of a first sprocket 50 disposed between the torque converter 16 and the transmission 20 in its axial direction, that is, in the direction of the axis CL1. The first sprocket 50 is connected through a power transmitting member in the form of a chain 84 to a second power transmitting portion in the form of a second sprocket 54 fixed to a second cylindrical member 52. The second cylindrical member 52 is a drive shaft of an oil pump 56 rotatable about an axis CL2, which drive shaft has a breather chamber 72 formed therethrough, as described below. The oil pump 56 is operated to pressurize the working fluid, so that the pressurized working fluid is delivered to the hydraulic control unit 86. It is noted that unlike the position of the counter shaft 34, the relative radial position of the first and second cylindrical members 14 and 52 with respect to each other is not limited for adequate transmission of the vehicle drive force. Accordingly, the radial position of the second cylindrical member 52 with respect to the first cylindrical member 14 can be determined as desired, by adjusting a span of the chain 84 between the first and second cylindrical members 14 and 52. Namely, the positions of the second cylindrical member 52 in the radial and circumferential or rotational directions of the first cylindrical member 14 rotatable about the axis CL1 can be determined or selected with a high degree of freedom. For instance, the second cylindrical member 52 having the breather chamber 72 can be sufficiently spaced apart from the differential gear device 40 wherein the lubricant can be relatively vigorously agitated. It is noted that the second cylindrical member 52 corresponds to a second shaft having the above-indicated breather chamber 72 of the vehicular breather device 100 according to the present invention.

Figure 5:
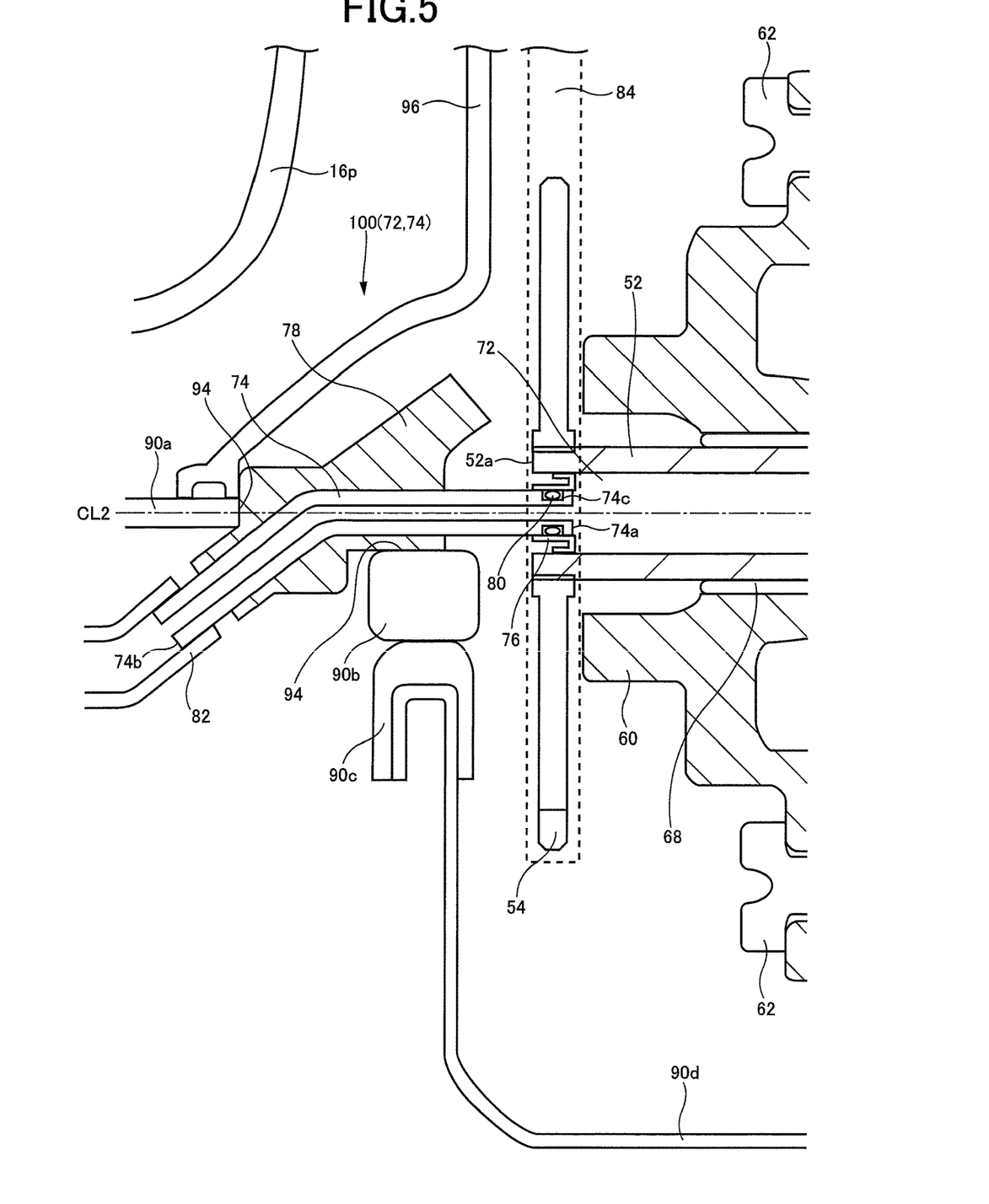
FIG. 5 is a cross sectional view showing in enlargement major parts of the oil pump of FIG. 4.

The torque converter 16, the transmission 20, the power transmitting path from the transmission 20 to the differential gear device 40, the oil pump 56 and the hydraulic control unit 86 are oil-tightly accommodated within a stationary member in the form of the above-indicated transaxle casing 90 of the vehicle 10. As described below, the transaxle casing 90 consists of a plurality of casing members, and has a communication hole 94 for communication between inside and outside of the transaxle casing 90, as shown in FIG. 5.

The hydraulic control unit 86 is arranged to control pressures of the working fluid to be fed from the oil pump 56 to the torque converter 16, and to actuators of respective hydraulically operated frictional coupling devices incorporated in the transmission 20, and to deliver the working fluid as the lubricant to gears, bearings and other components within the transaxle casing 90.

The vehicle 10 is provided with an electronic control device 98 including a so-called microcomputer which operates according to stored control programs to process input signals for implementing various controls of the vehicle 10. For instance, the electronic control device 98 implements an engine idling speed control to control an idling speed of the engine 12, according to hysteresis data obtained on the basis of a temperature Toil of the working fluid or lubricant within the transaxle casing 90 and a running speed V (km/h) of the vehicle 10. The temperature Toil (° C.) is represented by an output signal of a temperature sensor 200, while the vehicle running speed V is represented by an output signal of a vehicle speed sensor 202. The idling speed of the engine 12 is interpreted to mean an operating speed of the engine 12 while the engine 12 is operated in a non-load state.

Figure 2:
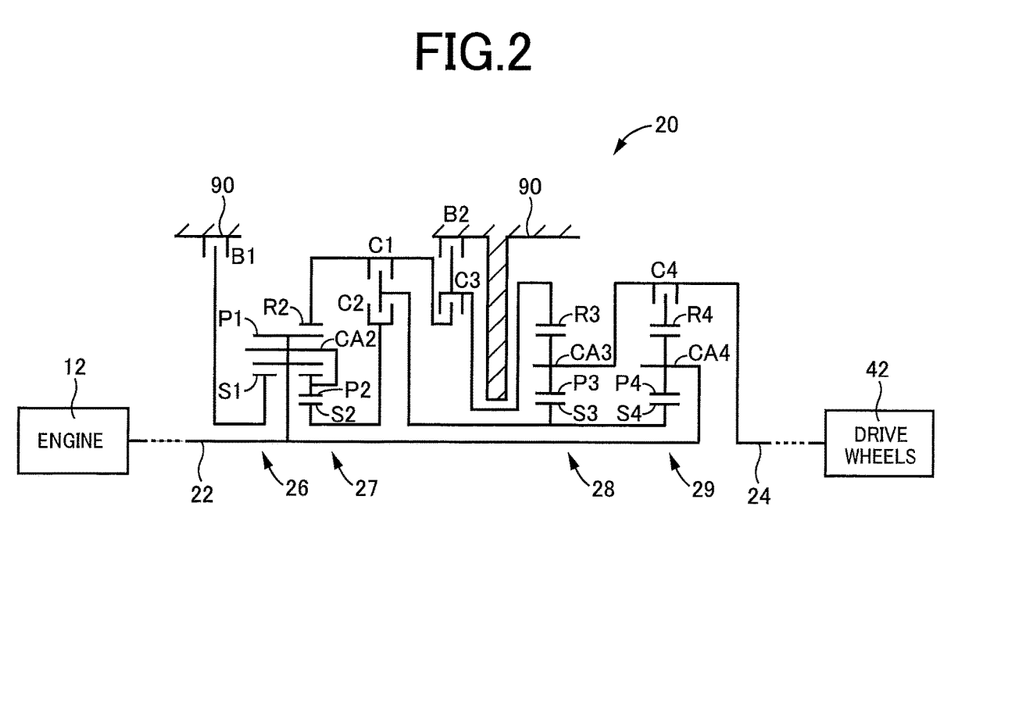
FIG. 2 is a schematic view showing an example of an arrangement of a transmission shown in FIG. 1.

FIG. 2 is the schematic view showing an example of an arrangement of the transmission 20 shown in FIG. 1. The transmission 20 includes: a first planetary gear set 26 of a single-pinion type having a sun gear S1, a pinion gear P1, and a carrier CA2; a second planetary gear set 27 of a double-pinion type having a sun gear S2, a plurality of pairs of pinion gears P2 and P1 meshing with each other, a carrier CA2, and a ring gear R2; a third planetary gear set 28 of a single-pinion type having a sun gear S3, a pinion gear P3, a carrier CA3 and a ring gear R3; and a fourth planetary gear set 29 of a single-pinion type having a sun gear S4, a pinion gear P4, a carrier CA4 and a ring gear R4. The transmission 20 is configured to transmit a rotary motion of the input shaft 22 to the output shaft 24 such that the speed of the rotary motion of the output shaft 24 is variable with respect to that of the input shaft 22. It is noted that the first and second planetary gear sets 26 and 27 cooperate to constitute a so-called "Ravigneaux type planetary gear train" wherein the two gear sets 26 and 27 are partly integrally connected to each other.

Figure 3:
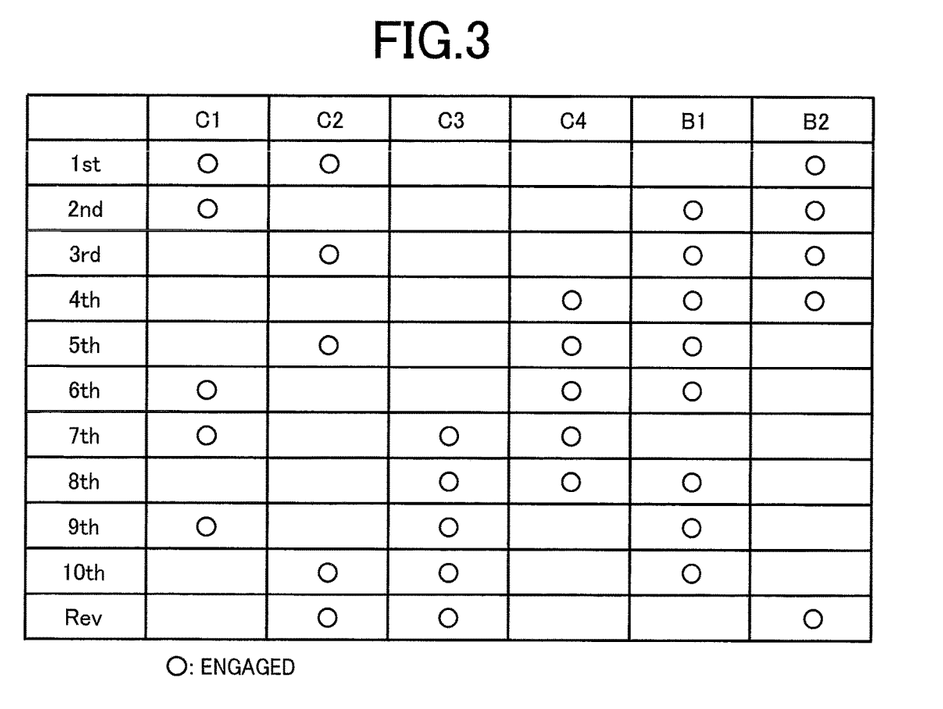
FIG. 3 is a table indicating operating states of hydraulically operated frictional coupling devices in respective gear positions of the transmission of FIG. 2.

Reference is now made to FIG. 3, which is the table indicating operating states of hydraulically operated frictional coupling devices in respective gear positions (speed positions) of the transmission 20 of FIG. 2. In FIG. 3, a mark "o" indicates an engaged state of each frictional coupling device, while the blank indicates a released state of the frictional coupling device. As indicated in the table of FIG. 3, the transmission 20 has ten forward drive speed positions "$1^{st}$" through "$10^{th}$", and one reverse drive position "Rev", which are selectively established in respective combinations of the engaged and released states of clutches C1, C2, C3 and C4, and brakes B1 and B2 selectively connected to the transaxle casing 90, which is a stationary member of the vehicle 10.

Figure 4:
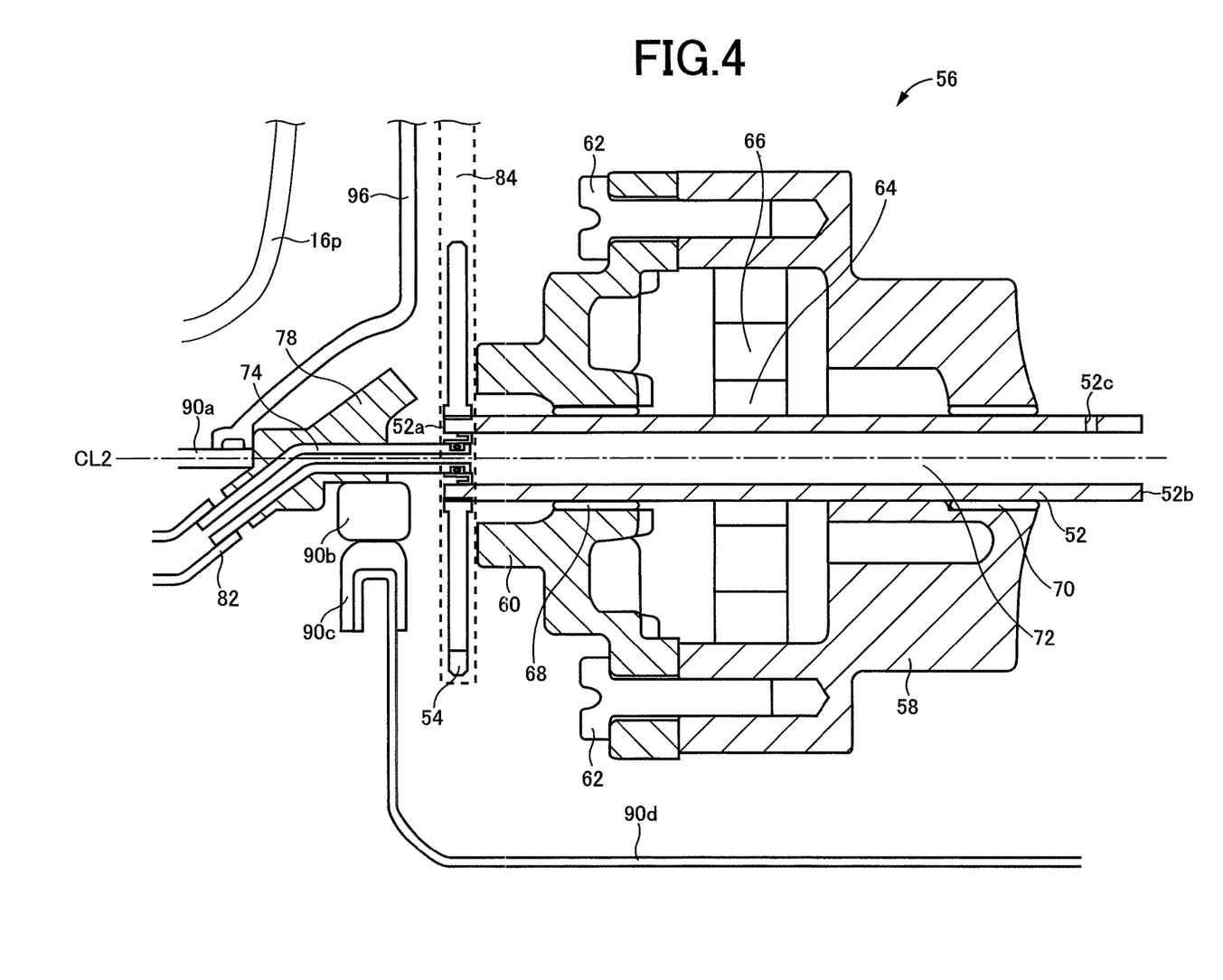
FIG. 4 is a cross sectional view of an oil pump shown in FIG. 1.

Reference is further made to FIGS. 4 and 5. FIG. 4 is the cross sectional view of the oil pump 56 of FIG. 1 taken in a plane including the axis CL2 of the second cylindrical member 52, while FIG. 5 is the cross sectional view showing in enlargement major parts of the oil pump 56 of FIG. 4.

As shown in FIG. 4, the oil pump 56 is an internal gear pump including: an internal gear 64; an external gear 66; a drive shaft in the form of the second cylindrical member 52; and a pump body 58 and a pump cover 60 which are fixed together with screws 62 so as to define a housing which accommodates the internal and external gears 64 and 66, and through which the second cylindrical member 52 extends. The pump body 58 is fixed to the stationary member in the form of the transaxle casing 90 (not shown in FIGS. 4 and 5), so that the pump body 58 and the pump cover 60 are held stationary. The pump cover 60 rotatably supports the second cylindrical member 52 at its one axial end portion 52a, through a first needle roller bearing 68, while the pump body 58 rotatably supports the second cylindrical member 52 at the other axial end portion 52b, through a second needle roller bearing 70. The internal gear 64, the external gear 66, and the pump body 58 and the pump cover 60 which accommodate the internal and external gears 64 and 66, cooperate to constitute a body portion of the oil pump 56.

As described above, the second cylindrical member 52 is a cylindrical member rotated about the axis CL2. The internal gear 64 accommodated within the above-indicated housing (formed by the pump body 58 and the pump cover 60) and fixedly mounted on the outer circumferential surface of the second cylindrical member 52 is rotated with the second cylindrical member 52, to rotate the external gear 66 which is disposed radially outwardly of the internal gear 64 and held in meshing engagement with the internal gear 64. The external gear 66 is rotated about an axis which is offset with respect to the axis CL2. As a result of rotary motions of the internal and external gears 64 and 66, the working fluid stored in an oil pan 90d is sucked into the oil pump 56 through an inlet (not shown), and the sucked working fluid is pressurized, so that the pressurized working fluid is delivered to the hydraulic control unit 86 through an outlet (not shown).

As shown in FIG. 1, a rotary motion of the first sprocket 50 fixed to the first cylindrical member 14 is transmitted through the chain 84 to the second sprocket 54 splined to the axial end portion 52a of the second cylindrical member 52. The body portion of the oil pump 56 is disposed on one of opposite sides of the second sprocket 54 which is remote from the torque converter 16 in the axial direction of the second cylindrical member 52 (in the direction of the axis CL2). Namely, the second sprocket 54 is disposed between the torque converter 16 and the body portion of the oil pump 56, in the axial direction of the second cylindrical member 52.

As shown in FIG. 4, an inside space within the transaxle casing 90 is divided into two parts by a partition wall 96 formed between the chain 84 and the pump shell 16p of the torque converter 16. The second cylindrical member 52 has a center bore serving as the above-indicated breather chamber 72, which is a part of an air passage through which the inside space of the transaxle casing 90 is open to the outside atmosphere, for eliminating a difference between the inside air pressure and the outside atmospheric pressure, which difference is caused by a variation of an air volume within the transaxle casing 90 due to a change of the temperature of the working fluid within the transaxle casing 90. The breather chamber 72 functions to separate oil particles from a stream of air flowing through the air passage. This breather chamber 72 formed through the second cylindrical member 52 cooperates with a tubular breather 74 to constitute the above-indicated vehicular breather device 100, as shown in FIG. 5. The breather 74 is disposed so as to extend through a communication hole 94 formed through the transaxle casing 90, and has an inner end portion 74a which is fitted in the axial end portion 52a of the second cylindrical member 52. The breather 74 has an outer end portion 74b, and is bent at its intermediate portion between the inner and outer end portions 74a and 74b. The other axial end portion 52b of the second cylindrical member 52 is open to the inside space within the transaxle casing 90, as shown in FIG. 4, so that the breather chamber 72 is held in communication with the inside space of the transaxle casing 90.

As shown in FIG. 5, the inner end portion 74a of the breather 74 has an outside diameter smaller than an inside diameter of the axial end portion 52a of the second cylindrical member 52, and is disposed within the axial end portion 52a, coaxially with the second cylindrical member 52. The inner end portion 74a has a circumferential groove 74c formed in its outer circumferential surface, and an O-ring 80 is fitted in the circumferential groove 74c. An annular plug 76 formed of a synthetic resin, for example, is interposed between the O-ring 80 fitted in the groove 74c, and the inner circumferential surface of the axial end portion 52a of the second cylindrical member 52. The plug 76 is fixed in contact with the inner circumferential surface of the axial end portion 52a of the second cylindrical member 52, such that the plug 76 is held in sliding contact with the outer circumferential surface of the O-ring 80, so that the plug 76 maintains oil tightness between the breather chamber 72 and the inside space within the transaxle casing 90. The plug 76 is rotated together with the second cylindrical member 52, and rotatable relative to the stationary breather 74. Oil tightness between the plug 76 and the stationary breather 74 is maintained with a sliding contact of the plug 76 with the O-ring 80 fixed to the breather 74.

The transaxle casing 90 consists of a first casing member 90a, a second casing member 90b, a third casing member 90c, and the above-indicated oil pan 90d, which are fixed together with screws, bolts or any other fastening members, through sealing members. The above-indicated communication hole 94 for communication between the inside and outside of the transaxle casing 90 is formed between the first and second casing members 90a and 90b.

The breather 74 is connected at its outer end portion 74b to one of opposite ends of a hose 82, which is open at the other end to the outside atmosphere. Thus, the breather chamber 72 is held in communication with the outside of the transaxle casing 90, namely, the outside atmosphere, through the breather 74 and the hose 82, and in communication with the inside space of the transaxle casing 90 through the axial end portion 52b of the second cylindrical member 52.

The breather 74 is fixed so as to extend through the communication hole 94 of the transaxle casing 90, with an oil sealer member 78 formed of a rubber material, for instance. Described more specifically, the oil sealer member 78 is fixedly disposed so as to extend through the communication hole 94 formed between the first and second casing members 90a and 90b. Thus, the oil tightness between the breather 74 and the transaxle casing 90 is maintained by the oil sealer member 78 fixedly fitted in the communication hole 94, so that the oil tightness between the inside and outside of the transaxle casing 90 is maintained by the oil sealer member 78.

During an operation of the engine 12, the second cylindrical member 52 is rotated with the rotary motion of the engine 12 transmitted thereto through the first cylindrical member 14, the first sprocket 50, the chain 84 and the second sprocket 54, as is apparent from FIG. 4. As a result of the rotary motion of the second cylindrical member 52, the air and lubricant existing in the breather chamber 72 formed through the second cylindrical member 52 are separated from each other with a centrifugal force generated with the rotary motion of the second cylindrical member 52, such that the lubricant is forced to move in the breather chamber 72 in the radially outward direction away from the axis CL2 toward the inner circumferential surface of the second cylindrical member 52. Described more specifically, when the air flows into the breather chamber 72, together with the agitated lubricant, the lubricant having a comparatively higher specific gravity is moved due to the centrifugal force, in the radially outward direction away from the axis CL2 toward the inner circumferential surface of the second cylindrical member 52, while the air having a comparatively lower specific gravity stays in the vicinity of the axis CL2, so that the lubricant and the air are separated from each other. The lubricant moved toward the inner circumferential surface of the second cylindrical member 52 is discharged out of the breather chamber 72, through radial through-holes 52c formed through the second cylindrical member 52 in its radial direction. Accordingly, the air almost free of the lubricant exists in a radially central part of the breather chamber 72 in the vicinity of the axis CL2, making it possible to reduce an amount of the lubricant to be mixed with a stream of the air flowing through the air passage through which the inside space of the transaxle casing 90 is open to the outside atmosphere through the communication hole 94.

Figure 6:
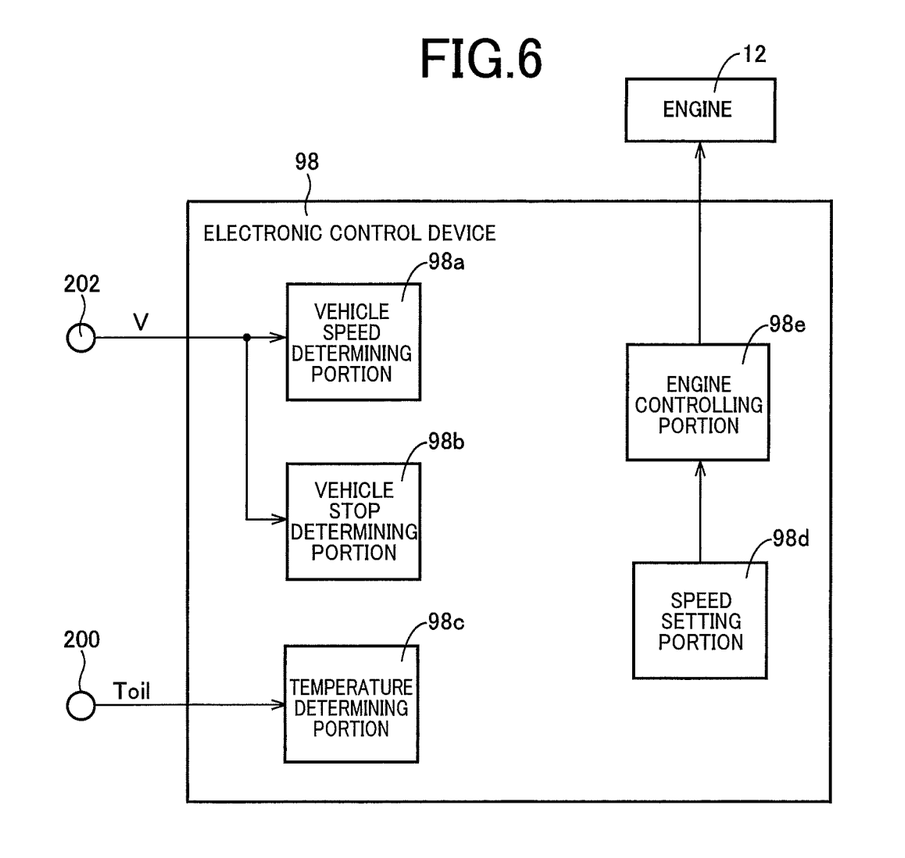
FIG. 6 is a functional block diagram illustrating major control portions of an electronic control device shown in FIG. 1.

Referring next to the functional block diagram of FIG. 6 illustrating major control portions of the electronic control device 98 shown in FIG. 1. The electronic control device 98 includes a vehicle speed determining portion 98a, a vehicle stop determining portion 98b, a temperature determining portion 98c, a speed setting portion 98d, and an engine controlling portion 98e, and is configured to implement the above-described engine idling speed control.

The vehicle speed determining portion 98a is configured to determine whether the vehicle running speed V represented by the output signal of the vehicle speed sensor 202 has been kept equal to or higher than a predetermined threshold value Vp, for more than a predetermined length of running time Time1 (sec).

If the vehicle speed determining portion 98a has determined that the vehicle running speed V has been kept equal to or higher than the predetermined threshold value Vp for more than the predetermined length of time Time1, the vehicle stop determining portion 98b determines whether the vehicle 10 is brought into stop within a predetermined length of threshold time Time2 (sec) after the vehicle running speed V represented by the output signal of the vehicle speed sensor 202 has been lowered below the threshold value Vp, namely, whether the vehicle 10 which has been running at a comparatively high speed V not lower than the threshold value Vp has been abruptly stopped. For instance, the vehicle stop determining portion 98b starts a time counter when the vehicle running speed V has been lowered below the threshold value Vp, and determines whether the vehicle 10 has been stopped before the started time counter has counted the predetermined length of threshold time Time2 (sec).

The temperature determining portion 98c is configured to determine whether the temperature Toil of the lubricant within the transaxle casing 90, which is represented by the output signal of the temperature sensor 200 when the vehicle 10 has been stopped, is equal to or higher than a predetermined threshold value Tp.

Figure 7:
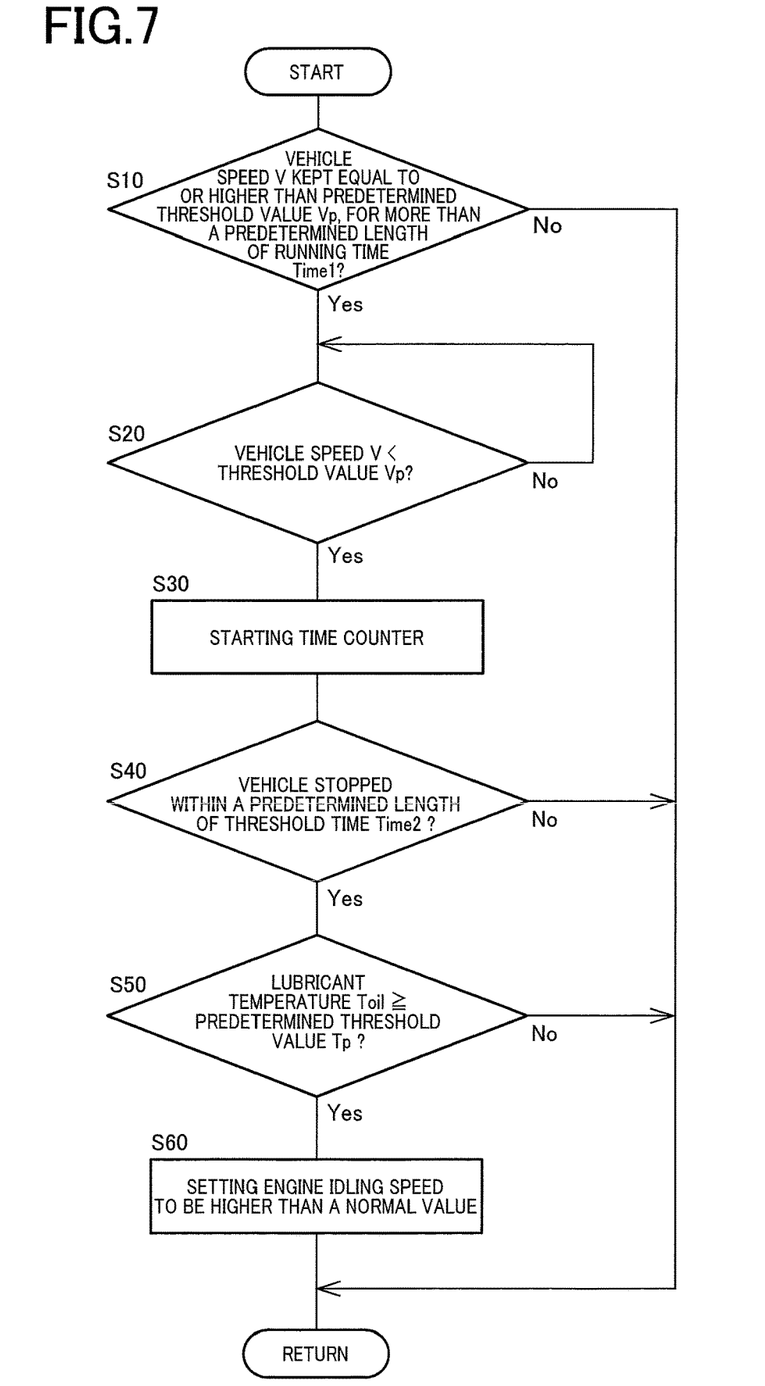
FIG. 7 is a flow chart illustrating major portions of a control operation performed by the electronic control device shown in FIG. 1, namely, an example of a control operation for raising an idling speed of an engine of the vehicle.

If the vehicle stop determining portion 98b has determined that the vehicle 10 running at the comparatively high speed not lower than the threshold value Vp has been abruptly stopped, and if the temperature determining portion 98c has determined that the lubricant temperature Toil when the vehicle 10 has been stopped is equal to or higher than the threshold value Tp, the speed setting portion 98d sets the idling speed of the engine 12 to be higher than when the vehicle 10 is relatively slowly stopped, or when the lubricant temperature Toil is lower than the threshold value Tp, namely, than in a normal state of running of the vehicle 10, that is, than when a negative determination is obtained in one of steps S10, S40 and S50 in a control operation or routine illustrated in the flow chart of FIG. 7 referred to below.

The engine controlling portion 98e is configured to implement the engine idling speed control for raising the idling speed of the engine 12 to the value which has been set by the speed setting portion 98d so as to be higher than that in the normal running state of the vehicle 10. This engine idling speed control is implemented by controlling an amount and timing of fuel injection into the engine 12.

It is noted that the above-described predetermined threshold value Tp of the lubricant temperature Toil, predetermined threshold value Vp of the vehicle running speed V, predetermined length of time Time1 and predetermined length of time Time1 are obtained by experimentation or simulation, as conditions for determining a running state of the vehicle 10 in which a capacity of the breather chamber 72 to separate particles of the lubricant from the air flowing therethrough together with the lubricant particles is not sufficient.

Reference is now made to the flow chart of FIG. 7 illustrating major portions of the control operation performed by the electronic control device 98 shown in FIG. 1, namely, an example of the control operation for raising the idling speed of the engine 12.

The control operation of FIG. 7 is repeatedly performed by the electronic control device 98.

The control operation is initiated with the step S10 corresponding to the vehicle speed determining portion 98a, to determine whether the running speed V of the vehicle 10 has been kept equal to or higher than the predetermined threshold value Vp, for more than the predetermined length of time Time1. If an affirmative determination is obtained in the step S10, the control flow goes to a step S20. If the negative determination is obtained in the step S10, one cycle of execution of the control operation is terminated.

The step S20 corresponding to the vehicle stop determining portion 98b is implemented to determine whether the running speed V of the vehicle 10 is lower than the predetermined threshold value Vp. If an affirmative determination is obtained in the step S20, the control flow goes to a step S30. If a negative determination is obtained in the step S20, this step S20 is repeatedly implemented until the affirmative determination is obtained.

The step S30 also corresponding to the vehicle stop determining portion 98b is implemented to start the time counter described above. The step S30 is followed by the step S40.

The step S40 also corresponding to the vehicle stop determining portion 98b is implemented to determine whether the vehicle 10 has been stopped within the predetermined length of time Time2 after the time counter is started. If an affirmative determination is obtained in the step S40, the control flow goes to a step S50. If the negative determination is obtained in the step S40, one cycle of execution of the control operation is terminated.

The step S50 corresponding to the temperature determining portion 98c is configured to determine whether the lubricant temperature Toil is equal to or higher than the predetermined threshold value Tp. If an affirmative determination is obtained in the step S50, the control flow goes to a step S60. If the negative determination is obtained in the step S50, one cycle of execution of the control operation is terminated.

The step S60 corresponding to the speed setting portion 98d is configured to set the idling speed of the engine 12 to be higher than the value in the normal running state of the vehicle 10, so that the idling speed of the engine 12 is controlled by the engine controlling portion 98e, so as to be higher than in the normal running state. One cycle of execution of the control operation is terminated with the step S60.

If the predetermined length of time Time2 has passed before the vehicle 10 has been stopped (namely, if the negative determination is obtained in the step S40), or if the lubricant temperature Toil has become lower than the predetermined threshold value Tp (namely, if the negative determination is obtained in the step S50), when the next cycle of execution of the control operation of the flow chart of FIG. 7 is executed after the step S60 is once implemented, the idling speed of the engine 12 set in the step S60 so as to be higher than in the normal running state of the vehicle 10 is cancelled, and replaced by the value to be used in the normal running state. Then, the control operation is repeatedly executed as described above.

The vehicular breather device 100 according to the present embodiment includes the second shaft in the form of the second cylindrical member 52, and the breather 74. The second cylindrical member 52 is rotated with a rotary motion of the first shaft in the form of the first cylindrical member 14 transmitted thereto through the transmission belt in the form of the chain 84, and is accommodated within the transaxle casing 90. The second cylindrical member 52 has the breather chamber 72 formed therethrough, and is disposed so as not to contribute to transmission of a vehicle drive force through the power transmitting system. The breather 74 is disposed so as to extend through the communication hole 94 formed through the transaxle casing 90, for communication between the breather chamber 72 and the outside atmosphere outside the transaxle casing 90. Thus, the second cylindrical member 52 having the breather chamber 72 formed therethrough is connected to the first cylindrical member 14 through the chain 84. Accordingly, the present vehicular breather device 100 has an improved degree of freedom of positioning of the breather chamber 72 formed through the second cylindrical member 52, in both of the radial and circumferential (rotational) directions of the first cylindrical member 14, namely, an improved degree of freedom of determination of a distance of the breather chamber 72 from the axis CL1 of rotation of the first cylindrical member 14, and an angular position of the breather chamber 72 in the direction of rotation of the first cylindrical member 14.

The present vehicular breather device 100 is further configured such that the first cylindrical member 14 by which the second cylindrical member 52 is rotated is rotated by the engine 12, so that the rotating speed of the second cylindrical member 52 is controllable by controlling the operating speed of the engine 12 operated to drive the first cylindrical member 14, so that a capacity of the breather chamber 72 to separate particles of the lubricant from the air flowing therethrough together with the lubricant particles is controllable. Where the vehicle 10 has been stopped within the predetermined length of time Time1 after the running speed V has been kept equal to or higher than the predetermined threshold value Vp for more than the predetermined length of time Time1, the engine idling speed control is implemented to raise the idling speed of the engine 12, if the lubricant temperature Toil when the vehicle 10 has been stopped is equal to or higher than the predetermined threshold value Tp. This engine idling speed control prevents insufficiency of the capacity of the breather chamber 72 to separate the lubricant particles from the air flowing therethrough together with the lubricant particles. Where the lubricant (working fluid) is vigorously agitated with its temperature Toil being abruptly raised during running of the vehicle 10 at a high speed for a relatively long length of time, the lubricant is splashed and scattered around, and is likely to enter the breather chamber 72, together with the air. When the vehicle 10 is abruptly brought into stop in this condition, the engine 12 is brought into its idling state with its operating speed being lowered, and the rotating speed of the first cylindrical member 14 is lowered, so that the rotating speed of the second cylindrical member 52 is accordingly lowered, whereby the capacity of the breather chamber 72 to separate the lubricant particles from the air flowing therethrough together with the lubricant particles, owing to a centrifugal force generated by the second cylindrical member 52, is accordingly reduced. Where the lubricant temperature Toil is relatively high, the viscosity of the lubricant is accordingly low, so that the size of the particles of the lubricant agitated or stirred within the transaxle casing 90 tends to be reduced, whereby the lubricant particles are less likely to be subjected to the centrifugal force. In this case, therefore, the rotating speed of the second cylindrical member 52 having the breather chamber 72 is raised to prevent insufficient of the capacity of the breather chamber 72 to separate the lubricant particles from the air flowing therethrough.

The present vehicular breather device 100 is adapted to be used for the vehicle 10 wherein the first cylindrical member 14 is the cylindrical member which extends from the pump shell 16*p* of the torque converter 16 rotated by the engine 12, in the axial direction of the torque converter 16 away from the engine 12. Namely, the drive force of the engine 12 is transmitted to the first cylindrical member 14 through an existing power transmitting mechanism in the power transmitting system, in the form of the torque converter 16 (its pump shell 16*p*). Accordingly, the present power transmitting mechanism between the engine 12 and the first cylindrical member 14 requires a reduced installation space, than any other power transmitting mechanism not normally existing in the power transmitting system.

The present vehicular breather device 100 is further adapted to be used for the vehicle 10 wherein the power transmitting system includes the transmission 20 having the input shaft 22 rotated by the torque converter 16 and partially extending through the bore formed through the first cylindrical member 14. The power transmitting system further has the first sprocket 50 for transmitting the rotary motion of the first cylindrical member 14 to the chain 84, and the first sprocket 50 is disposed between the torque converter 16 and the transmission 20 in the axial direction of the first cylindrical member 14. Accordingly, the first sprocket 50 disposed between the torque converter 16 and the transmission 20 may be a member having a relatively small length in the axial direction of the first cylindrical member 14, so that the torque converter 16 and the transmission 20 may be disposed so as to effectively utilize the inner space within the transaxle casing 90.

The present vehicular breather device 100 is further configured such that the second cylindrical member 52 is the drive shaft of the oil pump 56 disposed within the transaxle casing 90. Since the second cylindrical member 52 having the breather chamber 72 formed therethrough is the drive shaft of the oil pump 56, a space used for installation of the oil pump 56 is effectively utilized to provide the breather chamber 72 of the vehicular breather device 100. Further, the oil pump 56 need not be disposed near the first cylindrical member 14 in the radial direction of the first cylindrical member 14, so that a portion of the power transmitting system, which portion includes the torque converter 16 and the transmission 20, may be constructed with a reduced dimension in the axial direction of the first cylindrical member 14. In addition, the rotating speed of the second cylindrical member 52 relative to that of the first cylindrical member 14 can be suitably adjusted by suitably determining a gear ratio of the first and second sprockets 50 and 54 which are connected to each other through the chain 84. Accordingly, a delivery capacity of the oil pump 56 is determined according to the thus adjusted rotating speed of the second cylindrical member 52.

The present vehicular breather device 100 is also configured such that the second sprocket 54 for transmitting the rotary motion of the first cylindrical member 52 to the drive shaft of the oil pump 56 through the chain 84 is disposed between the torque converter 16 and the body portion of the oil pump 56 in the axial direction of the second cylindrical member 52. Namely, the body portion of the oil pump 56 is located on one of opposite sides of the second sprocket 54 which is remote from the torque converter 16 in the axial direction of the second cylindrical member 52. Thus, the body portion of the oil pump 56 can be located without an interference with the torque converter 16, and the torque converter 16 and the oil pump 56 can be disposed within the transaxle casing 90, so as to effectively utilize the inner space within the transaxle casing 90.

While the preferred embodiment of this invention has been described by reference to the drawings, it is to be understood that the invention may be otherwise embodied.

In the illustrated embodiment, the vehicle 10 is provided with the drive power source in the form of the internal combustion engine 12. However, the engine 12 may be replaced by an electric motor operated with an electric energy to generate a rotary drive force. Alternatively, the vehicle 10 may be replaced by a hybrid vehicle provided with an internal combustion engine and an electric motor.

In the illustrated embodiment, the vehicle 10 is the FF (front-engine front-drive) type vehicle. However, the vehicular breather device according to the present invention is equally applicable to any other type of vehicle.

In the illustrated embodiment, the second cylindrical member 52 having the breather chamber 72 is the drive shaft of the oil pump 56. However, the breather chamber 72 may be formed through a shaft which is connected to the drive shaft (52) of the oil pump 56, by two sprockets respectively fixed to the shaft of the breather chamber 72 and the drive shaft of the oil pump 56. In this case, too, the freedom of positioning of the breather chamber 72 can be improved.

In the illustrated embodiment, the vehicle speed sensor 202 is used by the electronic control device 98 when the engine idling speed control is implemented to raise the idling speed of the engine 12, when the vehicle 10 has been stopped within the predetermined length of time Time2 after the vehicle running speed V detected by the vehicle speed sensor 202 has been kept equal to or higher than the predetermined threshold value Vp for more than the predetermined length of time Time1. While the vehicle speed sensor 202 is provided to detect the rotating speed of one of the drive wheels 42, the vehicle speed sensor 202 may be replaced by any other speed sensor adapted to detect the rotating speed of any rotary member in the power transmitting path between the transmission 20 and the drive wheels 42, for instance, the rotating speed of the output shaft 24 of the transmission 20, or the counter shaft 34, as long as the vehicle running speed V can be obtained on the basis of the rotating speed of the rotary member detected by the speed sensor. The idling speed control of the drive power source in the form of the engine 12 may be implemented on the basis of the vehicle running speed V detected by the above-indicated speed sensor other than the speed sensor 202.

The electronic control device 98 provided in the illustrated embodiment is configured to implement the engine idling speed control for raising the idling speed of the engine 12, when both of the two predetermined conditions are satisfied, that is, (1) where the temperature Toil of the lubricant within the transaxle casing 90 when the vehicle 10 is in the stopped state is equal to or higher than the predetermined threshold value Tp, and (2) where the vehicle 10 has been stopped within the predetermined length of time Time2 after the vehicle running speed V has been kept equal to or higher than the predetermined threshold value Vp for more than the predetermined length of time Time1. However, the electronic control device 98 may be configured to implement the engine idling speed control for raising the idling speed of the drive power source in the form of the engine 12, in order to increase capacities in separating the lubricant particles from the air flowing through the breather chamber 72 together with the lubricant particles, when at least one of the two conditions described above is satisfied. For instance, the control operation of the flow chart of FIG. 7 may be modified so as to eliminate the step S50. In this case, the step S60 is implemented if the affirmative determination is obtained in the step S40, to implement the engine idling speed control for raising the idling speed of the engine 12, since the vehicle 10 has been stopped within the predetermined length of time Time2 after the vehicle running speed V has been kept equal to or higher than the predetermined threshold value Vp for more than the predetermined length of time Time1. Alternatively the control operation of FIG. 7 may be modified so as to eliminate the steps S10, S20 and S30, and to change the step S40 to simply determine whether the vehicle 10 has been stopped, rather than to determine whether the vehicle 10 has been stopped within the predetermined length of time Time2 (sec). In this case, the step S60 is implemented to implement the engine idling speed control, if the affirmative determination is obtained in the step S50, that is, if the lubricant temperature Toil when the vehicle 10 is in the stopped state is equal to or higher than the predetermined threshold value Tp. Thus, the rotating speed of the second cylindrical member 52 having the breather chamber 72 formed therethrough is raised by raising the rotating speed of the first cylindrical member 14 connected to the second cylindrical member 52, as a result of a rise of the idling speed of the engine 12. Accordingly, the engine idling speed control prevents insufficiency of the capacity of the breather chamber 72 to separate the lubricant particles from the air flowing through the breather chamber 72 together with the lubricant particles. Where the flow chart of FIG. 7 is modified so as to implement the engine idling speed control where only one of the above-indicated two conditions is satisfied (where the temperature Toil of the lubricant within the transaxle casing 90 when the vehicle 10 is in the stopped state is equal to or higher than the predetermined threshold value Tp, and where the vehicle 10 has been stopped after the vehicle running speed V has been kept equal to or higher than the predetermined threshold value Vp for more than the predetermined length of time Time1), the functional block diagram of FIG. 6 is accordingly modified so as to eliminate the functional portion or portions of the electronic control device 98, which corresponds to the step S50 or correspond to the steps S10, S20 and S30. It is noted that where an electric motor is provided in place of the engine 12 as the drive power source, the engine idling speed control to raise the idling speed of the engine 12 is replaced by a motor speed control to raise an operating speed of the electric motor. The engine idling speed control and the motor speed control are considered to be a speed control of the drive power source.

In the illustrated embodiment, the chain 84 is used as the power transmitting member. However, the power transmitting member may be a transmission belt. In this case, the first and second sprockets 50 and 54 connected to each other through the chain 84 are replaced by respective two pulleys connected to each other through the transmission belt.

While the preferred embodiment and its modifications have been described for illustrative purpose only, it is to be understood that the present invention may be embodied with various other changes and improvements, which may occur to those skilled in the art.

NOMENCLATURE OF ELEMENTS

10: Vehicle
12: Engine (Drive power source)
14: First cylindrical member (First shaft)
16: Torque converter
20: Transmission
22: Input shaft
50: First sprocket (First power transmitting portion)
52: Second cylindrical member (Second shaft)
54: Second sprocket (Second power transmitting portion)
56: Oil pump
72: Breather chamber
84: Chain (Power transmitting member)
90: Transaxle casing
90a: First casing member
90b: Second casing member
90c: Third casing member
90d: Oil pan
94: Communication hole
98: Electronic control device
100: Vehicular breather device

What is claimed is:

1. A vehicular breather device through which an inside space of a casing accommodating a power transmitting system of a vehicle is open to an outside atmosphere outside the casing, the vehicular breather device comprising:
 a second shaft rotated with a rotary motion of a first shaft of the power transmitting system transmitted thereto through a power transmitting member, the second shaft being accommodated within the casing, having a breather chamber formed therethrough, and being disposed so as not to contribute to transmission of a vehicle drive force through the power transmitting system; and
 a breather disposed so as to extend through a communication hole formed through the casing, for communication between the breather chamber and the outside atmosphere outside the casing,
 wherein the first shaft is rotated by a drive power source, and
 wherein the first shaft is a cylindrical member which extends from a pump shell of a torque converter rotated by the drive power source, in an axial direction of the torque converter away from the drive power source.

2. The vehicular breather device according to claim 1, wherein the power transmitting system includes: a transmission having an input shaft which is rotated by the torque converter and of which a part extends through an entirety of a bore formed through the cylindrical member; and a first shaft power transmitting portion for transmitting the rotary motion from the first shaft to the power transmitting member, the first shaft power transmitting portion being disposed between the torque converter and the transmission in an axial direction of the first shaft.

3. The vehicular breather device according to claim 1, wherein the second shaft is a drive shaft of an oil pump disposed within the casing, and the power transmitting system includes a power transmitting member power transmitting portion for transmitting the rotary motion from the power transmitting member to the drive shaft of the oil pump, the power transmitting member power transmitting portion being disposed between the torque converter and a body portion of the oil pump in an axial direction of the drive shaft.

4. The vehicular breather device according to claim 1, wherein the power transmitting member is a belt or a chain.

5. A vehicular breather device through which an inside space of a casing accommodating a power transmitting system of a vehicle is open to an outside atmosphere outside the casing, the vehicular breather device comprising:
   a second shaft rotated with a rotary motion of a first shaft of the power transmitting system transmitted thereto through a power transmitting member, the second shaft being accommodated within the casing, having a breather chamber formed therethrough, and being disposed so as not to contribute to transmission of a vehicle drive force through the power transmitting system; and
   a breather disposed so as to extend through a communication hole formed through the casing, for communication between the breather chamber and the outside atmosphere outside the casing,
   wherein the second shaft is a drive shaft of an oil pump disposed within the casing.

6. The vehicular breather device according to claim 5, wherein the first shaft is rotated by a drive power source.

7. The vehicular breather device according to claim 6, wherein the first shaft is a cylindrical member which extends from a pump shell of a torque converter rotated by the drive power source, in an axial direction of the torque converter away from the drive power source.

8. The vehicular breather device according to claim 7, wherein the power transmitting system includes: a transmission having an input shaft which is rotated by the torque converter and of which a part extends through an entirety of a bore formed through the cylindrical member; and a first shaft power transmitting portion for transmitting the rotary motion from the first shaft to the power transmitting member, the first shaft power transmitting portion being disposed between the torque converter and the transmission in an axial direction of the first shaft.

9. The vehicular breather device according to claim 7, wherein the power transmitting system includes a power transmitting member power transmitting portion for transmitting the rotary motion from the power transmitting member to the drive shaft of the oil pump, the power transmitting member power transmitting portion being disposed between the torque converter and a body portion of the oil pump in an axial direction of the drive shaft.

10. The vehicular breather device according to claim 6, wherein the vehicle is provided with an electronic control device configured to control an operation of the drive power source, and the electronic control device implements an idling speed control to raise an idling speed of the drive power source, for raising a rotating speed of the second shaft rotated by the first shaft and having the breather chamber, when a temperature of a lubricant within the casing when the vehicle is in a stopped state is equal to or higher than a predetermined threshold value, and/or when the vehicle has been stopped within a predetermined length of threshold time after a running speed of the vehicle has been kept equal to or higher than a predetermined threshold value for more than a predetermined length of running time.

11. The vehicular breather device according to claim 5, wherein the power transmitting member is a belt or a chain.

12. A vehicular breather device through which an inside space of a casing accommodating a power transmitting system of a vehicle is open to an outside atmosphere outside the casing, the vehicular breather device comprising:
   a second shaft rotated with a rotary motion of a first shaft of the power transmitting system transmitted thereto through a power transmitting member, the second shaft being accommodated within the casing, having a breather chamber formed therethrough, and being disposed so as not to contribute to transmission of a vehicle drive force through the power transmitting system; and
   a breather disposed so as to extend through a communication hole formed through the casing, for communication between the breather chamber and the outside atmosphere outside the casing,
   wherein the first shaft is rotated by a drive power source, and
   wherein the vehicle is provided with an electronic control device configured to control an operation of the drive power source, and the electronic control device implements an idling speed control to raise an idling speed of the drive power source, for raising a rotating speed of the second shaft rotated by the first shaft and having the breather chamber, when a temperature of a lubricant within the casing when the vehicle is in a stopped state is equal to or higher than a predetermined threshold value, and/or when the vehicle has been stopped within a predetermined length of threshold time after a running speed of the vehicle has been kept equal to or higher than a predetermined threshold value for more than a predetermined length of running time.

13. The vehicular breather device according to claim 12, wherein the first shaft is a cylindrical member which extends from a pump shell of a torque converter rotated by the drive power source, in an axial direction of the torque converter away from the drive power source.

14. The vehicular breather device according to claim 13, wherein the power transmitting system includes: a transmission having an input shaft which is rotated by the torque converter and of which a part extends through an entirety of a bore formed through the cylindrical member; and a first shaft power transmitting portion for transmitting the rotary motion from the first shaft to the power transmitting member, the first shaft power transmitting portion being disposed between the torque converter and the transmission in an axial direction of the first shaft.

15. The vehicular breather device according to claim 13, wherein the second shaft is a drive shaft of an oil pump disposed within the casing, and the power transmitting system includes a power transmitting member power transmitting portion for transmitting the rotary motion from the power transmitting member to the drive shaft of the oil pump, the power transmitting member power transmitting portion being disposed between the torque converter and a body portion of the oil pump in an axial direction of the drive shaft.

16. The vehicular breather device according to claim 12, wherein the power transmitting member is a belt or a chain.

* * * * *